United States Patent [19]

Villagran et al.

[11] Patent Number: 5,464,642
[45] Date of Patent: Nov. 7, 1995

[54] PROCESS FOR MAKING REDUCED-FAT FRIED SNACKS WITH LIGHTER, MORE EXPANDED SNACK STRUCTURES

[75] Inventors: Maria D. Villagran, West Chester; Lori J. Toman, Cincinnati; Kenneth D. Byars, Fairfied; Nancy C. Dawes, Cincinnati; Stephen P. Zimmerman, Wyoming, all of Ohio

[73] Assignee: The Procter & Gamble Company, Cincinnati, Ohio

[21] Appl. No.: 106,838

[22] Filed: Aug. 16, 1993

[51] Int. Cl.⁶ .............................. A21D 8/00; A21D 13/00
[52] U.S. Cl. .................... 426/439; 426/549; 426/808; 426/559; 426/440
[58] Field of Search ................... 426/439, 539, 426/549, 808, 649, 440

[56] References Cited

U.S. PATENT DOCUMENTS

| | | | |
|---|---|---|---|
| 3,784,716 | 1/1974 | Spangler | 426/289 |
| 4,272,554 | 6/1981 | Schroeder et al. | 426/321 |
| 4,455,321 | 6/1984 | Glable et al. | 426/551 |
| 4,770,891 | 9/1988 | Willard | 426/559 |
| 4,844,936 | 7/1989 | Cox et al. | 426/549 |
| 4,869,911 | 9/1989 | Keller | 426/94 |
| 5,066,499 | 11/1991 | Arciszewski | 426/21 |

FOREIGN PATENT DOCUMENTS

| | | | |
|---|---|---|---|
| 53044662 | 4/1978 | Japan | A23L 1/32 |
| 59203460 | 11/1984 | Japan | A21D 2/34 |
| 03072837 | 3/1991 | Japan | A21D 2/34 |

*Primary Examiner*—Jeanette Hunter
*Attorney, Agent, or Firm*—W. J. Winter; Rose Ann Dabek; J. C. Rasser

[57] ABSTRACT

Disclosed is a process for making from dough a reduced-fat fried snack which has a more expanded, lighter structure than conventional fried snacks. A dough is formed which contains from 50% to 70% flour (preferably potato flour), at least 3% hydrolyzed starches, from 1% to 10% calcium carbonate, and a relatively low level of added water (20% to 40%). The dough is formed into a sheet from which snack pieces are cut and fried. The fried snack pieces contain only 18% to 38% fat. The fried snack pieces are from 1% to 14% larger by volume as compared to conventional fried snack pieces of equal weight.

12 Claims, No Drawings

PROCESS FOR MAKING REDUCED-FAT FRIED SNACKS WITH LIGHTER, MORE EXPANDED SNACK STRUCTURES

TECHNICAL FIELD

This invention relates to a process for making fried snacks which have a more expanded, lighter structure and are lower in fat than other fried dough-based snacks. In particular, the process involves preparing fried snacks from a dough containing calcium carbonate, hydrolyzed starches and relatively low levels of water.

BACKGROUND OF THE INVENTION

A wide variety of starch and protein-based snack food products are presently available to the consumer. Many of these products are in the form of chips, strips, and extruded tubular pieces. Some of these products are expanded or puffed and contain a cellular or honeycombed internal structure. In addition, most of the present-day snack products contain a fairly high level of fat, either in the form of separately added ingredients, such as cheese, or in the form of fats imparted to the product during cooking, as in the case of corn or potato chips. Fat improves the flavor and palatability of these products.

There is, however, an increasing demand for healthier fried snacks which have less fat and have a healthier, lighter appearance than conventional fried snacks.

Many of the recent methods for making healthier fried snacks have been directed to lowering fat content. One such method involves coating chips with an aqueous dispersion of a high amylose starch. This is said to produce a potato chip with minimal oil pick-up and low variation in the amount of oil absorbed. Coating of breaded or batter food products with a film forming agent such as gelatin or starches is also said to lower oil absorption by the foods when they are fried.

Another method for reducing fat content in fried foods involves coating food surfaces with an aqueous solution of alpha amylase enzyme. This is said to lower the fat absorption of the product during frying. The amylase attacks starch molecules forming maltose, dextrins and other smaller starch fragments. Alpha amylase enzymes can also be added to a batter of potato solids from which a snack food is produced. The enzyme hydrolyzes the starch molecules, thereby increasing the solids content and reducing the viscosity of the batter. Fried potato snacks made from this batter are said to have a lower oil content than normal.

In yet another method, U.S. Pat. No. 4,272,554 discloses a process for making fried snack chips which have fewer surface blisters and are less oily. In accordance with this method, raw potato slices are contacted with a dilute aqueous solution of up to about 0.04 molar calcium. The calcium source must be a water-soluble salt such as calcium chloride, calcium acetate, calcium citrate, and calcium sulfamate. According to the patent disclosure, treatment solutions containing 0.5 molar or more of calcium should be avoided since such higher calcium concentrations will increase brittleness and oiliness of the chips.

There is a continuing need to provide additional methods for making even healthier fried snacks. It is therefore an object of this invention to provide such a method where the resulting fried snack has a lower fat content and a more expanded, lighter snack structure.

SUMMARY OF THE INVENTION

The present invention relates to a process of making reduced-fat fried snacks with more expanded, lighter snack structures. The process comprises forming a sheetable dough which contains from about 1% to about 10% calcium carbonate, from about 50% to about 70% of a source of starch based flour, at least about 3% hydrolyzed starches having a DE (Dextrose Equivalent) of from about 5 to about 30, from about 0% to about 5% emulsifier, and from about 20% to about 40% added water. The dough is then formed into a sheet. Snack pieces are cut from the sheet and fried for a time and at a temperature sufficient to form fried snacks which have a light, crispy, crunchy texture. The fried snack pieces contain from about 18% to about 38% fat and have from 1% to about 14% more volume relative to an equal weight of conventional dough-based fried snacks.

DETAILED DESCRIPTION OF THE INVENTION

A key element of the process of the present invention is the composition of the dough. The essential components in the dough are 1) calcium carbonate, 2) hydrolyzed starch, 3) starch-based flour, and 4) low moisture levels.

As used herein, "more expanded" and "lighter snack structures" refer to the volume expansion and reduced density, respectively, of the fried snacks made in accordance with the instant process. This volume expansion and reduced density are relative to the volume and density of conventional dough-based fried snacks. Expanded volume is measured indirectly by measuring the increased height of forty fitted and stacked, fried oval snack pieces.

All percentages and ratios herein are based on weight unless otherwise specified.

The process of the present invention is described in detail as follows.

I. Dough Formation

A particularly important aspect of the process herein is the formation of the dough. The dough is formed by combining calcium carbonate, hydrolyzed starch, starch based flour, and relatively small amounts of water. Optional materials such as emulsifiers, salts, flavorants, oil, preservative, and etc., can also be added to the dough.

This combination of essential materials provides three significant effects. First, it provides for a lighter, more expanded fried snack structure. This can be attributed to the use of calcium carbonate which acts as a leavening agent during frying. Secondly, it provides an improved ability to process the dough into sheets from which are subsequently formed snack pieces of predetermined shape and size which are then fried until crisp. This improved dough processing can be attributed primarily to the use of hydrolyzed starch and calcium carbonate. Thirdly, it provides for a fried snack with a lower fat content than conventional fried dough-based snacks. This can be attributed to the use of low moisture in the dough which in turn is made possible by the use of calcium carbonate and hydrolyzed starch.

Calcium carbonate

A key element in the formation of the dough is the use of calcium carbonate. It was found that calcium carbonate provides for the expansion of the dough during frying without increasing fat up-take secondary to such expansion and without causing excessive delamination and or surface blistering of the fried snack.

The dough comprises from about 1% to about 10%, preferably from about 3% to about 7%, more preferably from about 4% to about 6% of calcium carbonate. The calcium carbonate used will typically be in powder or granular form. The resulting fried snack will typically contain from about 0.25% to about 2.5%, more typically from about 0.75% about 1.5% of elemental calcium.

It was found that calcium carbonate is unique among leavening agents when used in dough-based fried snacks. Most leavening agents act quickly in releasing carbon dioxide in the dough thus resulting in one major drawback excessive blistering and or delamination of fried snacks due to the rapid release of the carbon dioxide. These large surface blisters and delaminated pockets will take on oil during frying thus increasing the fat content of the fried snacks and changing its appearance. Moreover, some delaminated fried snacks tend to break apart when packaged. Unlike other leavening agents, calcium carbonate does not promote either excessive blistering or delamination when it is added to the dough at the levels described herein. Instead, it releases carbon dioxide more slowly during frying thus resulting in smaller pockets within the fried snacks. These smaller pockets act to expand the structure of the fried snacks but do not readily take on oil during frying.

It was also found that the use of calcium carbonate to expand fried snacks is unique among processes commonly used to achieve such expansion. Other expansion methods typically result in increased oil uptake during frying. Such other methods include, for example, incorporating into the dough 1) higher moisture levels, 2) cellulose, 3) increased starch levels, and or 4) other leavening agents (e.g., sodium bicarbonate, ammonium bicarbonate). Overworking the dough also tends to result in expanded fried snacks. The process herein by which the fried snacks are expanded does not result in increased fat uptake. In fact, fat levels are actually reduced due to the use of certain hydrolyzed starches and low moisture levels in the dough as described hereinafter.

The calcium carbonate also tends to reduce the water absorption index of the dough. This index is a measure of the water absorption capacity of dough. The dough described herein, less calcium carbonate, will have a water absorption index typically between about 8.5 and 11. Dough comprising the calcium carbonate will have a water absorption index typically of between about 6 and 10. This lower index will tend to 1) reduce the formation of pinholes in sheeted dough, 2) reduce the adhesion of preformed dough pieces to each other during processing, 3) reduce fat levels in the fried snack, and 4) reduce the significance of lot-to-lot variations in water absorption capacity of potato flakes.

Starch based flour

An important component of this dough is the starch based flour. Potato flour is the most preferred source of starch based flour. Suitable sources of potato flour include, dehydrated potato flakes and granules, mashed potato materials, and dried potato products. Other tuber and grain flours such as corn, barley, tapioca, peanut, wheat, oat, rice, and soy meal can be used in the dough. These starch based flours can be blended to make snacks of different composition and flavor.

Suitable starches can be used in combination with the potato flour. Examples of such materials are potato starch, tapioca starch, cornstarch, oat starch, rice starch and wheat starch. Most preferably these starches are cooked so the starch has gelatinized and then are dried and milled to make a flour. These starches are called pregelatinized starches. For example, potato flour is at least 90% pregelatinized starch. Preferred flours contain at least 80% pregelatinized starch.

Hydrolyzed starch

Hydrolyzed starches are also an important ingredient for the processability of the doughs which have relatively low water levels. In the absence of hydrolyzed starches, low moisture levels in the dough can prevent formation of a continuous, smooth extensible dough sheet and can hinder subsequent expansion of the dough pieces during frying, even if the dough can be sheeted. It also affects the elasticity of the dough. In addition, low moisture doughs tend to produce a harder and more brittle texture in the resulting snack products. Unlike most low moisture doughs, the low moisture dough herein can be sheeted and fried with relative ease.

As used herein, the term "hydrolyzed starches" refers to oligosaccharide-type materials that are typically obtained by acid or enzymatic hydrolysis of starches, preferably corn starch. Suitable hydrolyzed starches for inclusion in the dough include maltodextrins and corn syrup solids.

The hydrolyzed starches for inclusion in the dough have Dextrose Equivalent (D. E.) values of from about 5 to about 30, preferably from about 10 to about 20. Maltrin® M050, M100, M150, and M180 (available from Grain Processing Corporation, Iowa) are preferred maltodextrins, and Maltrin® M200, M250, and M300 are preferred corn syrup solids. The D. E. value is a measure of the reducing equivalence of the hydrolyzed starch referenced to dextrose and expressed as a percent (on a dry basis). The higher the D. E. value, the more reducing sugars are present.

Hydrolyzed starches are included in the dough in an amount of at least about 3%, with a usual range of from about 3% to about 15%. Preferably, hydrolyzed starches are included in an amount of from about 5% to about 12%.

The use of hydrolyzed starches in the process reduces the work input needed to form the dough. These starches reduce the resistance of the dough to flow by acting as a plasticizer that replaces water. Thus, the use of these hydrolyzed starches allows for the formation of a sheetable dough with less water.

Water content

As previously alluded to, another important characteristic of the dough is its water content. As used herein, the term "added" refers to water which has been added to the dry dough ingredients. Water which is inherently present in the dry dough ingredients, such as in the case of the sources of flour and starches, is not included in the added water. The level of water in flours and starches is usually from about 3% to about 8%. However, if the maltodextrin or corn syrup solids are added as a solution or syrup, the water in this syrup or solution must be accounted for as "added water". The doughs of the present invention comprise from about 20% to about 40%, preferably from about 23% to about 38%, added water.

This low level of water in the dough along with the addition of calcium carbonate and hydrolyzed starches provides doughs which can form cohesive sheets. In addition, the low moisture level in the dough is important in reducing the oil content of the final fried snack pieces.

Optional ingredients

Emulsifiers are preferably used in the dough, typically in minor amounts from about 0% to about 5%, preferably from about 0.5% to about 3%, and most preferably from about 1.5% to about 2.5%. Emulsifiers are used as a sheeting aid to avoid overworked sticky doughs (overworking increases free amylase levels) and to reduce puffing and blistering in the fried product. Lower moisture doughs, when fried, typically yield harder snack products. To make products with textures similar to those made from higher moisture doughs, the level of emulsifier is typically reduced.

Preferably, the emulsifiers are mono- and di-glycerides of saturated and unsaturated fatty acids, and in particular mono- and di-glycerides of stearic and palmitic acids. Sucrose mono- and diesters of saturated and unsaturated long chain fatty acids can also be used. Other emulsifiers such as polyglycerol esters, polyethoxysorbitan esters, can also be used.

Salt, flavorings, and/or seasonings can also be used in the dough or sprinkled on the surface of the snack after frying.

Dough preparation

The dough can be prepared by any suitable method for combining together the previously described ingredients. Typically, a loose, dry dough is prepared by thoroughly mixing together the calcium carbonate, starch based flour, hydrolyzed starch, and optional materials (e.g., emulsifier, flavoring, salt, seasoning ) with sufficient added water to obtain the previously defined hydrolyzed starch and water levels. Preferred devices for mixing together these dough ingredients are conventional mixers. Hobart® mixers are used for batch operations and Turbulizer ® mixers can be used for continuous mixing operations. However, extruders can also be used to mix the dough and to form the sheets or shaped pieces.

II. Sheeting, Snack Piece Formation and Frying.

Once prepared, the dough is then formed into a relatively flat, thin sheet. Any method suitable for forming such sheets from starch based doughs can be used. For example, the sheet can be rolled out between two counter rotating cylindrical rollers to obtain a uniform, relatively thin sheet of dough material. Any conventional sheeting, milling and gauging equipment can be used.

Doughs of the present invention are usually formed into a sheet having a thickness of from about 0.015 to about 0.035 inches (from about 0.038 to about 0.09 cm), and preferably to a thickness of from about 0.015 to about 0.025 inches (from about 0.038 to about 0.062 cm).

The dough sheet is then formed into snack pieces of a predetermined size and shape. These snack pieces can be formed using any suitable stamping or cutting equipment.

The snack pieces can be formed into a variety of shapes. For example, the snack pieces can be in the shape of ovals, squares, circles, a bowtie, a star wheel, or a pin wheel.

The snack pieces are fried. Preferably the snacks are prepared by a continuous frying method and are constrained during frying. An apparatus as described in U.S. Pat. No. 3,626,466 (Liepa, 1971) can be used. The dough pieces are cut from the sheet, shaped using a movable, apertured mold half to shape the cut dough pieces and then held during subsequent frying by a second apertured mold half. A reservoir containing a frying medium is used. The shaped, constrained pieces are passed through the frying medium until they are crisp and have a final moisture content of from about 0.5% to about 4%. Continuous frying or batch frying of the snack pieces in a non-constrained mode is also acceptable. In this method the pieces are immersed in the oil on a moving belt or basket.

If desired, the snack pieces can be fried to moisture contents of 10% or less and then heated with hot air, superheated steam or inert gas to lower the moisture level to 4% or less. This is a combined frying/baking step.

Typical frying medium include fats and oils derived from animal and vegetable sources. Any hydrogenated or unhydrogenated fat can be used. These include corn oil, olive oil, soybean oil, palm oil, cottonseed oil, canola oil, rapeseed oil, sunflower seed oil, lard, tallow, peanut oil, among others. Synthetic triglycerides can also be used, including low calorie or zero calorie fats, e.g. polyol polyesters of fatty acids such as sucrose polyesters, etc. The snack pieces are fried at temperatures between about 300° F. (148° C.) and 450° F. (232° C.). The exact fry time is controlled by the temperature of the oil and the starting water content. The fry time and temperature is easily determined by one skilled in the art.

The snack products made from this process typically contain from about 18% to about 38%, preferably from about 23% to about 29%, of fat. This is a lower fat content than that found in most conventional fried snacks.

The lubricity of the fried snack can be enhanced by increasing the fat content up to about 44% by spraying oil on the snack. This additional oil can be sprayed onto the fried snack when it emerges from the fryer, or when it is removed from the mold used in constrained frying. Any number of unhydrogenated or partially hydrogenated oils, such as soybean, cottonseed, peanut, corn, sunflower, canola, etc., can be sprayed onto the snack product. Generally these oils should be predominantly liquid at room temperature, since they are easier to spray and do not solidify on the snack product giving a waxy mouth impression as a more solid fat would do. Lower molecular weight oils, i.e. those containing short chain fatty acids can also be used for this purpose. These lower molecular weight oils are not ordinarily used in frying because of their low volatility and flash points. Polyol polyesters of fatty acids can also be used, as can synthetic triglycerides. These include low calorie and nonabsorbable fats such as sucrose polyesters. See for example, Mattson et al U.S. Pat. No. 3,600,186 and Jandacek U.S. Pat. No. 4,005,195 which describe these fats. Preferably the oils for spraying will have an iodine value greater than 75, and most preferably above 90.

Oils with characteristic flavors or highly unsaturated oils can be sprayed on the snack product. Oils such as olive oil, avocado oil, safflower oil, sesame oil, walnut oil or peanut oils can be used. In addition, oils with added flavors can be used. These include butter flavored oils, natural or artificial flavored oils, herb oils and oils with garlic or onion flavors added. This is a way to introduce a variety of flavors without having the flavor undergo browning reactions during the frying. It also avoids adding the flavor to the dough and having the flavor react with or leach into the oil during the frying process. This method can be used to introduce healthier oils which would ordinarily undergo polymerization or oxidation during the heating necessary to fry the snacks.

Oil spray can be used to increase the oil content of the fried snack from the 18% to 38% level as it emerges from the fryer to as high as 44% using this additional step.

III. EXAMPLES

The process of the present invention is illustrated by the following specific examples.

Example 1 (Control)

The following ingredients were combined in the manner described below to form the control product.

| | |
|---|---|
| Potato Flakes | 42% |
| Potato Starch | 12% |
| Maltodextrin M180 | 11% |
| Added Water | 32% |
| Duex ® emulsifier | 3% |

The potato flakes and starch are blended in a Turbulizer® mixer. The maltodextrin is dissolved in the water and added to the blend. The Duex® emulsifier (a mixture of mono- and diglycerides available from the Procter & Gamble Company, Cincinnati, Ohio) is also added directly to the blend. The blend is mixed to form a loose, dry dough. Residence time in the mixer is between 30 and 60 seconds.

The dough is sheeted by continuously feeding it through a pair of sheeting rolls forming an elastic continuous sheet without pin holes. Sheet thickness is controlled to 0.020 inches (0.05cm). The dough sheet is then cut into oval shaped pieces and fried in a constrained frying mold at 375° F. to dryness (about 12 seconds). The frying oil is a blend of cottonseed and corn oils. The fried pieces contain about 25% fat. Forty of the fried oval pieces, when fitted and stacked together, have a combined height of 86 mm and a combined weight of 80 grams.

Example 2

Samples A, B and C are each formed into dough and processed into fried snack pieces with lighter, more expanded snack structures.

| Ingredients | Sample A | Sample B | Sample C |
|---|---|---|---|
| Potato Flakes | 42% | 38.1% | 42% |
| Potato Starch | 12% | 10.9% | 12% |
| Maltodextrin M180 | 11% | 10.0% | 11% |
| Calcium Carbonate | 4% | 4% | 4% |
| Added Water | 28% | 32% | 28.5% |
| Duex ® emulsifier | 3% | 3% | 2.5% |

The potato flakes, potato starch, and calcium carbonate are blended in a Turbulizer® mixer. The maltodextrin is dissolved in the water and then added to the blend. The emulsifier (Duex ®, a mixture of mono- and diglycerides available from the Procter & Gamble Company, Cincinnati, Ohio) is also added directly to the blend. The blend is mixed to form a loose, dry dough. Residence time in the mixer is between about 30 and 60 seconds.

The dough is sheeted by continuously feeding it through a pair of sheeting rolls forming an elastic continuous sheet without pin holes. Sheet thickness is controlled to 0.020 inches (0.05cm). The dough sheet is then cut into oval shaped pieces and fried in a constrained frying mold at 375° F. to dryness (about 10 seconds). The frying oil is a blend of cottonseed and corn oils.

The fried snack pieces from Samples A, B, C and control product have the following characteristics.

| | fat content | Height of 40 stacked chips | Weight of 40 stacked chips | Volume expansion relative to control prod. |
|---|---|---|---|---|
| A | 25% | 92 mm | 80 gm | 7% |
| B | 25% | 92 mm | 80 gm | 7% |
| C | 25% | 98 mm | 80 gm | 14% |
| Control | 25% | 86 mm | 80 gm | — |

Example 3

The following ingredients are processed as in Example 2 to form reduced-fat fried snack pieces with lighter, more expanded snack structures.

| | |
|---|---|
| Potato flakes | 11% |
| Corn flour | 29% |
| Corn Starch | 6% |
| Potato Starch | 6% |
| Maltodextrin M180 | 11% |
| Calcium carbonate | 4% |
| Added Water | 30% |
| Duex ® emulsifier | 3% |

Water activity of the dough is 7.8. Pieces fried from the dough contain 25% fat. Forty of the fried oval pieces, when fitted and stacked together, are 92 mm high and weigh 80 grams. The snack volume is expanded about 7% relative to an equal weight of the control product.

Example 4

The following ingredients are processed as in Example 2 to form reduced-fat fried snack pieces with lighter, more expanded snack structures.

| | |
|---|---|
| Oat Flour | 42% |
| Wheat Starch | 6% |
| Maltodextrin M180 | 9% |
| Calcium carbonate | 4% |
| Added Water | 30% |
| Duex ® emulsifier | 3% |

Water activity of the dough is 6.0. Pieces fried from the dough contain 23% fat. Forty of the fried oval pieces, when fitted and stacked together, are 96 mm high and weigh 80 grams. Volume expansion is 14% relative to an equal weight of the control product.

What is claimed is:

1. A process for making Fried snacks, which process comprises the steps of:
   (a) Forming a sheetable dough consisting essentially of
      (1) from about 1% to about 10% calcium carbonate;
      (2) from about 50% to about 70% of a source of starch based flour comprising pregelatinized starch;
      (3) at least about 3% hydrolyzed starches having a DE of from about 5 to about 30;
      (4) from about 0% to about 5% emulsifier;
      (5) from about 20% to about 40% added water;
   (b) forming the dough into a sheet;
   (c) forming snack pieces of predetermined size and shape from the sheet; and
   (d) trying said snack pieces.

2. The process of claim 1 wherein the sheetable dough comprises from about 4% to about 6% calcium carbonate.

3. The process of claim 1 wherein the dough is formed into a sheet having a thickness of from about 0.038 to about 0.09 cm.

4. The process of claim 3 wherein the hydrolyzed starch is selected from the group of maltodextrin or corn syrup solids.

5. The process of claim 4 wherein the pregelatinized starch based flour is potato flour selected from the group consisting of potato flakes, potato granules and mixtures thereof.

6. The process of claim 5 wherein the dough contains from about 0.5% to about 3% emulsifier.

7. The process of claim 6 wherein the emulsifier is a mixture of mono- and diglycerides of saturated and unsaturated fatty acids.

8. The process of claim 7 wherein the dough comprises from about 23% to about 38% added water.

9. The process of claim 8 wherein the dough comprises from about 5% to about 12% maltodextrin, having a D. E. of from 10 to about 20.

10. The process of claim 9 wherein the dough sheet is cut into oval shaped dough pieces.

11. The process of claim 9 wherein the oval shaped dough pieces are constrained fried.

12. The process of claim 9 wherein the dough is fried in an oil selected from the group consisting of hydrogenated or unhydrogenated cottonseed oil, soybean oil, corn oil, tallow, olive oil, canola oil, rapeseed oil, peanut oil and mixtures thereof.

* * * * *